Aug. 5, 1941.   B. L. KLINE   2,251,742

MEANS FOR RECORDING SIGNALS ELECTRICALLY

Filed Aug. 31, 1935

ACTIVE LAYER OF LEAD THIOSULPHATE

CONDUCTING PAPER

CALENDERED COATING OF LEAD THIOSULPHATE

CONDUCTING PAPER

UNIFORM INK FILM CONTAINING LEAD THIOSULPHATE

CONDUCTING PAPER   METALLIC LAYER

INVENTOR
B.L. KLINE
BY Eugene C. Brown
ATTORNEY

Patented Aug. 5, 1941

2,251,742

UNITED STATES PATENT OFFICE 2,251,742

MEANS FOR RECORDING SIGNALS ELECTRICALLY

Bernard L. Kline, Manhasset, N. Y., assignor to The Western Union Telegraph Company, New York, N. Y., a corporation of New York Application August 31, 1935, Serial No. 38,825

14 Claims. (Cl. 204—2)

The present invention relates to a means for electrically recording visible marks on a recording surface and particularly to a flexible recording sheet adapted for use in a telegraphic receiving system in which electrical potentials representing received signals serve to cause marking of a visible record in a more facile and improved manner.

Known telegraphic receiving papers of one kind are dependent upon the effect of light to produce a chemical change in a recording medium and must therefore be used and stored under special conditions. Other receiving papers of the prior art which rely on the chemical change in a recording medium to produce a visible record upon passage of an electric current must be used in a moist condition. Still other recording papers of the prior art depend upon the effect of externally applied heat to produce a chemical change in a recording medium and these papers have the serious disadvantage of requiring relatively complicated receiving apparatus to apply the heat in amounts varying in accordance with the received signals. Recording blanks produced in accordance with the present invention are free of the above enumerated disadvantages.

A major object of the present invention, therefore, is to provide a novel and improved dry telegraphic recording blank which does not require special handling, is not adversely affected by exposure to light and which is adapted for use with recording apparatus of an extremely simple nature.

The present invention is based on the discovery that dry lead thiosulphate will be decomposed upon exposure to an electric charge or passage of an electric current and thereby leave a colored compound in or on a recording sheet or web. The chemical change upon which my novel method relies may be produced by voltages and currents such as are used in telegraphic work.

Accordingly, therefore, it is a primary object of the present invention to provide a prepared telegraphic recording blank which will receive a mark thereon in the dry state upon application of electrical potentials in response to received signals.

Another object of the present invention is to provide a novel method and means for obtaining a permanent telegraphic record without the necessity for developing or after treatment.

A related object is to obtain a record which is instantly visible thereby permitting high speed recording.

In practicing the invention in one of its preferred forms, the recording medium is applied to the surface or to the fibrous body of a sheet or web of paper which has the property of conducting electricity or which is rendered conducting in a manner fully disclosed as an important part of the present invention. This latter feature of the invention is described in my copending application Serial No. 30,555, filed July 9, 1935, and entitled "Telegraphic transmission of intelligence," now Patent No. 2,229,091, issued January 21, 1941. The present application is a continuation of the said copending application and is designed to cover in detail certain of the receiving aspects of the entire invention disclosed in said copending application.

It is also within the scope of the present invention to apply an adherent ink-like film of a recording medium disclosed herein upon the surface of a web or sheet of paper which has the inherent property of conducting electricity or of applying such a film upon the surface of a composite sheet having an outer metallic coating.

Accordingly, a further object of the invention is to provide a telegraphic recording blank comprising an electrically conducting sheet or web having a surface film of a dry recording medium.

Further and more specific objects will appear in the following complete disclosure of the invention in its several aspects.

Referring to the drawing.

Figure 1:
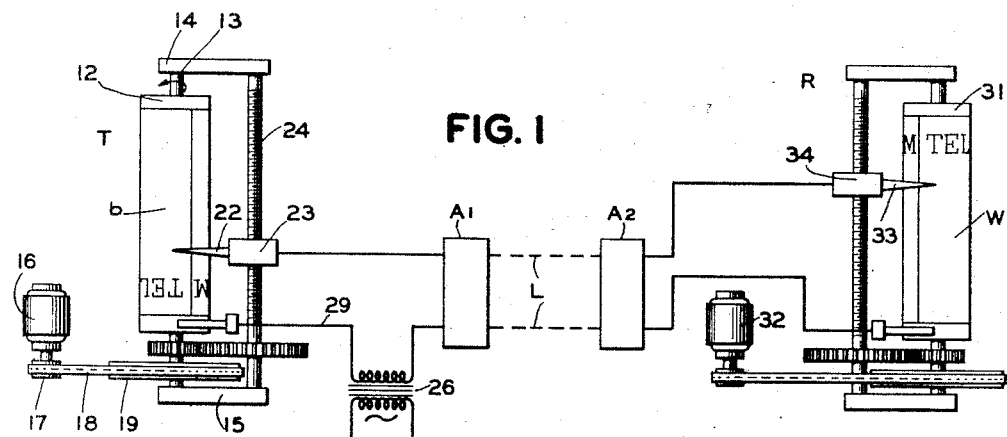
Fig. 1 illustrates diagrammatically a facsimile system embodying transmitting and recording means, the said system being of the type in which a telegraphic blank embodying the present invention is adapted to be used.

Referring for the present to Fig. 1 of the drawing, there is shown a transmitter T comprising a rotatable metallic cylinder 12 supported by a driving shaft 13 which is journaled in a suitable manner in the frame members 14 and 15. During transmission of signals, the cylinder is rotated in the direction indicated by the arrow by suitable means such as the motor 16. The latter may conveniently be of the alternating current synchronous type and is connected by a driving pulley 17 and the belt 18 to the driven pulley secured for rotation with the shaft 13. Means are provided as shown, to prevent slippage of the belt on the pulleys.

Transmission is effected by the apparatus illustrated in Fig. 1 in the manner described in my patent above referred to. Briefly, a scanning electrode or stylus 22, whose point bears on the surface of a blank b bearing conductive characters, is supported by a traveling carriage 23 adapted for longitudinal movement. The stylus 22 is caused to traverse the cylinder in a longitudinal manner by means of the rotatable threaded shaft 24, and therefore the stylus point will describe a spiral path as it moves over the surface of the transmitting blank and thus produce a scanning action.

The method of obtaining the scanning movement described above is well known as are various other methods of scanning a given field, and likewise the action of the receiver R which is to be briefly described and which forms no part of the present invention, is well known. The transmitting apparatus T and the receiving apparatus R may include transmitting and receiving amplifiers $A_1$ and $A_2$ respectively, which are interconnected by an available communication circuit L. If desired, the transmitted signals may have a carrier frequency component introduced by the transformer 26 which is connected in series with the lead 29 from the transmitting drum 12.

At the receiving end the recording is to be accomplished by any apparatus suitable for the purpose. It is to be especially noted that a telegraphic blank produced in accordance with the present invention enables the receiving device to be of an extremely simple nature. The receiver R illustrated by Fig. 1 shows one arrangement for recording upon a recording web or blank w and comprises a rotatable cylinder 31 of substantially the same diameter as the cylinder of the transmitter T. The cylinder 31 is rotated in synchronism with the transmitting cylinder 12 in any suitable manner, as by means of an alternating current synchronous motor 32 or other kind of motor which is kept in step with the transmitting motor 16 by any known method of obtaining synchronism. The receiving blank which may be of the kind embodying the present invention, is secured to the cylinder 31 in any suitable manner so that it may be traversed by the point of the scanning stylus 33. The stylus 33 is mounted on a carriage 34 resting upon a threaded shaft rotated with the cylinder 31. The threaded shaft in combination with the rotation of the cylinder produces the scanning action of the stylus 33. The incoming signals are repeated and amplified in the amplifier $A_2$ in the manner well known in the art to translate the signals into suitable current impulses of the received image.

It will be understood that the receiver just described forms no part of the present invention and that any known receiver of a like nature may be used. Also, it is to be noted that the only essential of a suitable receiver is that it shall possess an electrode or stylus similar to the stylus 33 which is capable of exposing the message blank to an electric charge or to cause passage of a current through the blank in accordance with incoming signals.

Figure 2:
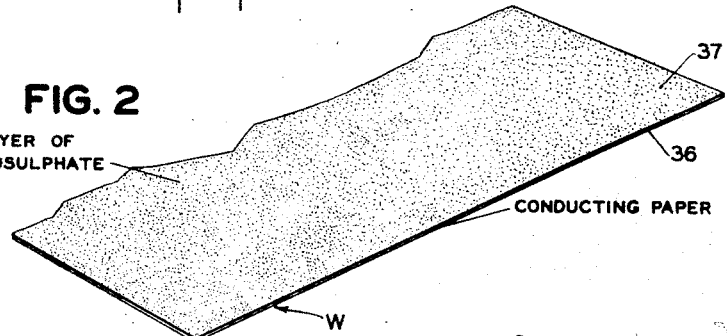
Fig. 2 is a perspective view of one form of receiving blank embodying the present invention.

A message blank w embodying the invention in its simplest form is shown in Fig. 2 of the drawing wherein reference numeral 36 represents a sheet of fibrous material such as paper. A sulphite base paper or a kraft paper is preferable for use as the body portion of the blank inasmuch as it has a high wet strength. The two papers mentioned by way of example are long fibre papers and for this reason they possess the property of having high tensile strength when wetted. Any ordinary paper even of low wet strength may be used when the paper is coated with a calendered film. One such film which is suitable comprises a binder incorporating albumen or starch which is applied as a film and calendered in the usual manner. The calendered film reinforces the paper and aids in making it suitable for use in producing message blanks embodying the present invention.

The paper layer 36 is impregnated with sodium nitrate dissolved in an alcohol of low volatility and low hygroscopicity such, for example, as tri-ethylene glycol, as disclosed in Patent 2,229,091 referred to above. The paper sheet 36 may be impregnated with the electrolytic solution by moistening the surface thereof or in any other suitable way. The layer 37 of the recording medium is applied by dusting lead thiosulphate powder upon the surface of the paper layer 36. The paper layer 36 may be of any distinctive color and the coating of lead thiosulphate 37 applied in this manner does not have sufficient covering power to hide a surface upon which it is placed and therefore the distinctive color of the paper layer 36 will be preserved. In using the blank w prepared as described above, it is placed upon a conducting surface, for example, the cylinder 31 of the receiving appartus illustrated by Fig. 1, and the stylus 33 is brought lightly into contact with the coated surface 37 of the paper bearing layer 36. Preferably the marks are produced upon the blank w by using a cathodic stylus and, therefore, the cylinder 31 will be connected to the positive pole of the source of received signals and the stylus 33 will be connected to the negative pole of the source of received signals. When this is done, the marks produced on the paper 36 are black and the record simulates ordinary printing or writing as it appears as a black mark or marks on the white paper. In the event that alternating current signals are received, a record mark will be produced when the signal current is of a given instantaneous polarity.

The electrolyte with which the paper 36 is impregnated may include potassium iodide, sodium formate, sodium benzoate, sodium bromide, iron chloride, or meta-nitrobenzene sulphonic acid. The preferred electrolyte made up of sodium nitrate and tri-ethylene glycol causes the paper 36 to have a relatively high conductivity and does not have any appreciable discoloring effect upon the paper. The alcoholic solvents mentioned cause the electrolyte to remain in solution in the paper for an indefinite time, especially where considerable quantities of blanks are stored in facial contact. Where the blank material in accordance with the present invention is made up in the form of a long web which is rolled up for storage, the electrolyte also remains in solution in a satisfactory manner for an indefinite period. Individual sheets or portions of the roll are available at any time without initial treatment for use in a receiving apparatus.

The record produced by the recording medium 37 is permanent in character and the blank will not be marked by after handling.

The stylus 33 of the receiving device R does not have any mechanical action upon the surface of the blank and therefore the stylus may merely touch the surface of the blank during reception of messages. This eliminates possible damage to the surface of the blank during reception of signals.

The nature of the marks comprising the received image is altered upon reversal of the polarity of the receiving stylus provided that a non-oxidizing electrolyte is used.

Figure 3:
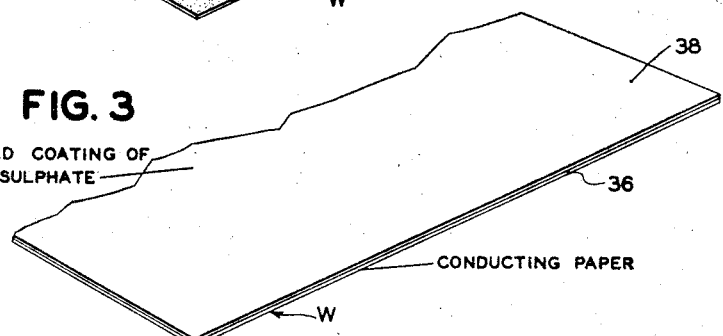
Fig. 3 is a perspective view of a modified form of telegraph blank embodying the present invention.

The modified form of blank shown in Fig. 3 of the drawing comprises a layer of paper 36 which may be of any suitable kind. Reference numeral 38 indicates a coating in which lead thiosulphate powder is substituted for the clay generally used in the manufacture of coated paper stock. Following application of the coating substance containing lead thiosulphate, the paper is calendered in the usual manner. If the coating 38 is applied to a layer of paper after the paper has been calendered, it is then necessary to recalender the paper sheet. As pointed out above, a calendered surface aids in strengthening the paper. In the embodiment of Fig. 3, the calendered surface contains lead thiosulphate as an integral part thereof.

The coating 38 will generally comprise a water solution of the binder having in suspension a quantity of the lead thiosulphate and therefore it is preferable to apply the coating 38 in the nature of a film to the paper surface before the electrolyte is applied to the fibrous body of the paper. This prevents possible washing out of the electrolyte when the film 38 is applied, thereby insuring that the paper 36 will be of uniform conductivity.

Figure 4:
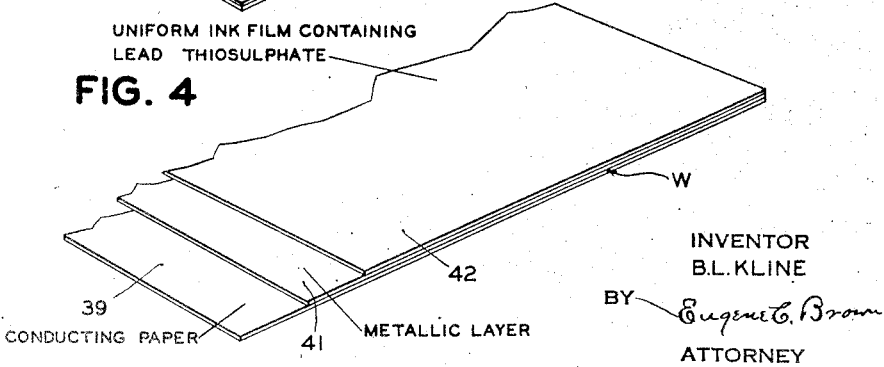
Fig. 4 is a perspective view of a composite recording blank embodying the present invention.

Fig. 4 of the drawing illustrates a composite recording blank embodying the present invention. A sheet or web of paper 39 is employed which is manufactured by having particles of graphite or carbon black incorporated in the pulp from which the paper is made. Such paper is inherently a conductor of electricity and therefore it is suitable for use by merely applying the lead thiosulphate to its surface. In order to make visible the marks recorded upon the paper by passage of electric current, it is desirable to provide a surface having a color which contrasts with the color of the mark produced by the recording medium. One means of making the recorded marks visible is to apply a metallic layer 41 to one face of the conducting paper 39. As illustrated by Fig. 4 of the drawing, the metallic face 41 is preferably a sheet of foil such as aluminum foil. It will be understood, however, that it is within the scope of my invention to apply the metallic coating 41 to the paper as a powder or to apply the said metallic coating in the form of a layer of metallic paint. The recording medium is applied to the metallic layer 41 as a film like layer of ink containing lead thiosulphate in a suitable vehicle. The film 42 as illustrated by Fig. 4 of the drawing, is uniform in character and adheres to the surface of the metallic layer 41. This ink lacks covering power and therefore to present a suitable background for marks which are produced on the black surface of the paper, it is desirable to add an opaque material such as titanium dioxide. When the metallic layer described above is sufficiently continuous, increased opacity is not essential.

A satisfactory formula demonstrated to be suitable comprises two parts of lead thiosulphate and one part of titanium dioxide ground in linseed oil varnish to which drier has been added. The amount of linseed oil is not critical and is added in an amount suitable to produce the most desirable consistency depending upon the method of application of the ink to the blank. Among the contemplated methods of applying the ink to a blank are spraying, in which case thinning with a volatile solvent is necessary, or continuous brushing. If desired, the ink may be tinted by addition of an appropriate toner of any desired shade. In the embodiment of Fig. 4 of the drawing, instead of applying or incorporating the recording medium in an ink film, it may be applied directly to the surface of the paper 39 in a water suspension in a suitable binder followed by a calendering operation.

As an alternative to the foregoing methods of preparing a telegraph blank by applying a superficial coating of lead thiosulphate to the fibrous body of the blank, it is within the scope of the present invention to incorporate lead thiosulphate in the pulp prior to the manufacture of paper therefrom, and when this is done, the resulting product may be made electrically conducting at any time by applying the nonaqueous electrolyte solution disclosed herein in the manner pointed out above.

From the foregoing disclosure of my invention in the several aspects thereof, it will be seen that I have provided a recording medium which possesses advantages not to be found in recording mediums of the prior art. A recording blank constructed in accordance with the teachings of the present invention can be used in a dry state which facilitates the handling thereof and makes unnecessary the use of special arrangements in the receiving apparatus to provide for moistening prior to and during reception of signals which it is desired to record. Further, marking is effected by electrical means and therefore the recording apparatus may be extremely simple. The record produced in accordance with the novel method set forth above is instantaneously visible and no development or after treatment is required. Since the record is produced immediately, the recording method according to the present invention is capable of operation at any desired speed.

The nature of the invention will be determined from the foregoing and the scope thereof is defined in the appended claims.

I claim as my invention:

1. A recording blank comprising a body portion, said body portion having in intimate contact therewith, over the recording surface of the blank, a coating of a recording medium comprising lead thiosulphate in an amount sufficient to produce a marking effect upon selectable areas of said recording surface upon application of an electrical signaling potential to said areas.

2. A recording blank comprising a body portion, said body portion having on a surface thereof a coating of a recording medium comprising lead thiosulphate in an amount sufficient, upon decomposition thereof in selectable areas by the application of an electrical signaling potential to said areas, to form a compound of contrasting appearance with respect to adjoining areas of said surface.

3. A recording blank comprising an electrically conductive support, said conductive support having in intimate contact therewith, over the recording surface of the blank, a coating of a recording medium comprising lead thiosulphate in sufficient quantity to produce a color change in selectable areas of said recording surface when electrical signaling potential is applied to said selectable areas of said recording surface, so as to produce a record by the signaling potential applied thereto.

4. A recording blank comprising an electrically conductive support, said conductive support having in intimate contact therewith, over the recording surface of the blank, a coating of a recording medium of contrasting color to said support comprising lead thiosulphate and a pigment of greater covering power than lead thiosulphate, said coating being sufficiently thick to substantially mask said support, whereby when electrical signaling potential is applied to selected areas of said recording surface of the blank a color change will occur in said selected areas of said recording surface so as to produce a record by the signaling potential applied thereto.

5. A recording blank comprising an electrically conductive support, said conductive support having in intimate contact therewith, over the recording surface of the blank, a coating of a recording medium comprising an ink including lead thiosulphate and a binder, said lead thiosulphate being in sufficient quantity to produce a color change in selectable areas of said recording surface when electrical signaling potential is applied to said selectable areas of said recording surface, so as to produce a record by the signaling potential applied thereto.

6. A recording blank comprising a fibrous sheet impregnated with a conductive solution of an electrolyte and a glycol, said impregnated fibrous sheet having in intimate contact therewith, over the recording surface of the blank, a coating of a recording medium comprising lead thiosulphate, whereby when electrical signaling potential is applied to selected areas of said recording surface of the blank a color change will occur in said selected areas of said recording surface, so as to produce a record by the signaling potential applied thereto.

7. A recording blank comprising an electrically conductive support, said support containing solid conducting particles dispersed throughout the body of the support to render the same conducting, said conductive support having in intimate contact therewith, over the recording surface of the blank, a coating of a recording medium comprising lead thiosulphate, whereby when electrical signaling potential is applied to selected areas of said recording surface of the blank a color change will occur in said selected areas of said recording surface so as to produce a record by the signaling potential applied thereto.

8. A recording blank comprising an electrically conductive support, said support containing carbon particles dispersed throughout the body of the support to render the same conducting, said conductive support having in intimate contact therewith, over the recording surface of the blank, a coating of a recording medium comprising lead thiosulphate, whereby when electrical signaling potential is applied to selected areas of said recording surface of the blank a color change will occur in said selected areas of said recording surface so as to produce a record by the signaling potential applied thereto.

9. A recording blank comprising an electrically conductive support, said conductive support having in intimate contact therewith, over the recording surface of the blank, a coating of a recording medium comprising lead thiosulphate and titanium dioxide, whereby when electrical signaling potential is applied to selected areas of said recording surface of the blank a color change will occur in said selected areas of said recording surface so as to produce a record by the signaling potential applied thereto.

10. A recording blank comprising an electrically conductive support, said conductive support bearing a recording medium comprising lead thiosulphate in sufficient quantity to produce a color change in selectable areas of said recording surface when electrical signaling potential is applied to said selectable areas of the recording surface, so as to produce a record by the signaling potential applied thereto.

11. A recording blank comprising an electrically conductive fibrous support having a calendered surface, said calendered surface of the conductive support having in intimate contact therewith, over the recording surface of the blank, a coating of a recording medium comprising lead thiosulphate, whereby when electrical signaling potential is applied to selected areas of said recording surface of the blank a color change will occur in said selected areas of said recording surface so as to produce a record by the signaling potential applied thereto.

12. A recording blank comprising an electrically conductive carbon bearing paper having in intimate contact therewith, over the recording surface of the blank, a coating of a recording medium comprising lead thiosulphate and titanium dioxide, whereby when electrical signaling potential is applied to selected areas of said recording surface of the blank a color change will occur in said selected areas of said recording surface so as to produce a record by the signaling potential applied thereto.

13. A recording blank comprising an electrically conductive support, said conductive support having in intimate contact therewith, over the recording surface of the blank, a coating of a recording medium consisting essentially of lead thiosulphate in such quantity as to produce a color change in the lead thiosulphate in selectable areas of said recording surface when electrical signaling potential is applied to said selectable areas of said recording surface, so as to produce a record by the signaling potential applied thereto.

14. A recording blank comprising an electrically conductive support, said conductive support having in intimate contact therewith, over the recording surface of the blank, a coating of a recording medium comprising lead thiosulphate, whereby when electrical signaling potential is applied to selected areas of said recording surface of the blank a color change will occur in said selected areas of said recording surface, said conductive support being of a contrasting color to said recording medium, and said coating of recording medium being sufficiently thick to substantially mask said conductive support.

BERNARD L. KLINE.